UNITED STATES PATENT OFFICE 2,254,191

P-AZIDOBENZENE COMPOUNDS

Richard O. Roblin, Jr., Stamford, Conn., assignor to American Cyanamid Company, New York, N. Y., a corporation of Maine No Drawing. Application August 6, 1940, Serial No. 351,643

10 Claims. (Cl. 260—296)

This invention relates to p-azido benzene sulfonamides and a method of preparing such compounds.

The products of the present invention are therapeutically active and can be used in the treatment of various infectious diseases. They may also be employed as intermediates in preparing a variety of chemical compounds by condensation with various reagents. The p-azido benzene sulfonamides included in this class may be represented by the following general formula:

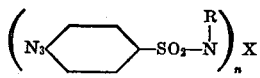

in which X represents hydrogen, alkyl radicals or a metal, R represents hydrogen, alkyl, and acyl radicals or heterocyclic radicals such as pyridine, thiazole or pyrimidine rings which are either unsubstituted or contain substituent radicals in place of one or more hydrogen atoms in the chain or ring, and $n$ is a whole number equal to the valence of X.

In preparing the p-azido benzene sulfonamides I have subjected a p-amino sulfonamide to diazotization using sodium nitrite and sulfuric acid, and then reacted the diazonium salt with hydrazine. The azido group is formed in the para position of the benzene ring. Another method is to react the diazonium salt with hydroxylamine to yield the p-azidobenzene sulfonamide.

The invention will be illustrated by the following examples but is not limited to the details therein set forth.

EXAMPLE 1 p-Azidobenzenesulfonamide 43 parts of sulfanilamide were suspended in 100 parts of a mixture of ice and water, and the reaction vessel cooled externally to maintain the temperature at approximately 0° C. 73.5 parts by weight of concentrated sulfuric acid were then added with efficient stirring. Further portions of ice were added to maintain the low temperature. A 10% aqueous solution containing approximately 17.2 parts of sodium nitrite was then added gradually until a test portion of the reaction mixture gave a positive test with starch-iodide paper. The resulting mixture was added to 350 parts of an ice-water mixture containing 123 parts of sodium acetate and 11 parts of 85% hydrazine. The solid which separated was removed by filtration and extracted with acetone to separate the product from sodium sulfate. The acetone solution was evaporated to small volume and cold water added to throw out the crude p-azidobenzenesulfonamide. The product was purified by recrystallization from water. Thirty parts of purified p-azidobenzenesulfonamide were obtained in the form of large yellow needles—M. P. 119° C. with strong decomposition.

EXAMPLE 2

2-p-Azidobenzenesulfonamidopyridine 31 parts of 2-sulfanilamidopyridine were added to 500 parts of ice-water. To the resulting slurry were added 36 parts by weight of concentrated sulfuric acid with efficient cooling and stirring. The diazotization was carried out as described in Example 1 using 75 parts of potassium acetate and 5.6 parts of 85% hydrazine in 175 parts of water. The reaction mixture was stirred for ½ hour and the crude 2-p-azidobenzenesulfonamidopyridine removed by filtration. It was purified by recrystallization from methanol-water and mixtures of mono-ethyl ether of ethylene glycol and water. Sixteen parts of purified product (M. P. 186°–187° C., decomp.) were obtained.

Other p-azidobenzenesulfonamido compounds can be prepared. Thus, for example when 3-sulfanilamidopyridine is diazotized instead of the 2-sulfanilamidopyridine and subjected to the same procedure the corresponding 3-p-azidobenzenesulfonamidopyridine results. In a similar manner other p-azidobenzenesulfonamide compounds can be prepared such as p-azidobenzenesulfonamidothiazoles, p-azidobenzenesulfonamido pyrimidines, and the like.

Instead of employing the unsubstituted products such as described in the examples given above, derivatives in which various substituents are attached to carbon atoms of the heterocyclic ring and/or metals or alkyl radicals replace the hydrogen of the sulfonamido group may be used to give the corresponding substituted p-azidobenzenesulfonamides.

If it is desired to use the compounds of the present invention in the form of their salts, the p-azidobenzenesulfonamides can be reacted with an alkali metal hydroxide in concentrated aqueous solution. Warming is sometimes advantageous in bringing about salt formation and the product is crystallized out of solution by cooling, or if desired, crystallization from absolute alcohol can be effected. Salts of the heavy metals such as gold, copper, iron, and the like, can be obtained by a reaction of an aqueous solution of the alkali metal salts with a solution of the desired heavy metal salt. The salts of the heavy metals are either insoluble or have such a low degree of solubility that they readily precipitate out of solution.

What I claim is:

1. Compounds of the general formula:

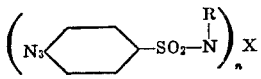

in which X is a member of the group consisting of hydrogen, alkyl radicals and metallic ions, R is a member of the group consisting of hydrogen, alkyl, acyl and heterocyclic radicals and $n$ is a whole number equal to the valence of X.

2. Compounds of the general formula:

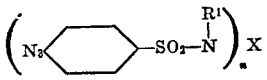

in which $R^1$ is a member of the group consisting of hydrogen and heterocyclic radicals, X is a member of the group consisting of hydrogen, alkyl radicals and metallic ions, and $n$ is a whole number equal to the valence of X.

3. Compounds of the general formula:

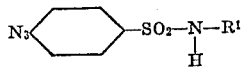

in which $R^1$ is heterocyclic radical.

4. As a new chemical compound p-azidobenzenesulfonamide.

5. As a new chemical compound 2-p-azidobenzenesulfonamidopyridine.

6. A process for preparing compounds of the following general formula:

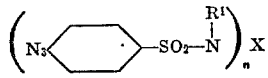

in which $R^1$ is a member of the group consisting of hydrogen and heterocyclic radicals, X is a member of the group consisting of hydrogen, alkyl radicals and metallic ions, and $n$ is a whole number equal to the valence of X which comprises subjecting a p-aminobenzenesulfonamide compound to diazotization followed by reaction with a compound included in the group consisting of hydrazine and hydroxlamine.

7. A process of preparing compounds of the following general formula:

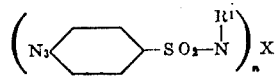

in which $R^1$ is a member of the group consisting of hydrogen and heterocyclic radicals, X is a member of the group consisting of hydrogen, alkyl radicals and metallic ions, and $n$ is a whole number equal to the valence of X, which comprises subjecting a p-aminobenzenesulfonamide compound to diazotization followed by reaction with hydrazine.

8. A process of preparing compounds of the following general formula:

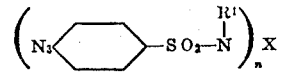

in which $R^1$ is a member of the group consisting of hydrogen and heterocyclic radicals, X is a member of the group consisting of hydrogen, alkyl radicals and metallic ions, and $n$ is a whole number equal to the valence of X, which comprises subjecting a p-aminobenzenesulfonamide compound to diazotization followed by reaction with hydroxylamine.

9. A process of preparing compounds of the following general formula:

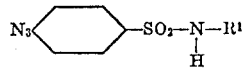

in which $R^1$ is a member of the group consisting of hydrogen and heterocyclic radicals which comprises subjecting a p-aminobenzenesulfonamide compound to diazotization followed by reaction with hydrazine.

10. A process of preparing compounds of the following general formula:

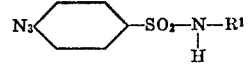

in which $R^1$ is a member of the group consisting of hydrogen and heterocyclic radicals which comprises subjecting a p-aminobenzenesulfonamide compound to diazotization followed by reaction with hydroxylamine.

RICHARD O. ROBLIN, Jr.